UNITED STATES PATENT OFFICE.

DAVID AHL, OF NEWVILLE, PENNSYLVANIA.

IMPROVEMENT IN SURGICAL SPLINTS.

Specification forming part of Letters Patent No. 33,470, dated October 15, 1861.

*To all whom it may concern:*

Be it known that I, DAVID AHL, of Newville, in the county of Cumberland and State of Pennsylvania, have invented a new and useful Improvement in Surgical Splints; and I do hereby declare that the following is a full, clear, and exact description of the same.

The object of this invention is to make surgical splints and fracture apparatus which will conform to the configuration of the member or part under treatment, and will sustain the injured part with a uniform pressure, and which may at any time be readily modified in shape in further conformity with the reduction of a swelling or dislocation.

It consists in saturating cloth or felt or any other similar material that is suitable for the purpose with certain gums and other matter that will be hereinafter more particularly described, and in molding it upon a naked limb or model of the configuration desired so that when it has assumed the required shape it will afford the necessary support with a uniformly-distributed pressure. The material used is not influenced by cold or moderately warm water, which may be freely used in the reduction of dislocations and inflammations; and when it is desired to alter the shape of the splint in conformity with a reduction it may be readily accomplished by the application of heat when its own elasticity should be insufficient for the purpose.

To enable others skilled in the arts appertaining to my invention to make and use the same, I will proceed to describe the composition and application of the materials used in the manufacture of my splints.

The material which I prefer to use for the basis of my invention is felted cloth, which I cut into pieces of the general shape required and saturate by preference with a solution of shellac in alcohol, and then dry and immerse in boiling water, and mold upon a limb or model similar to the part to which it is to be applied. Previous to softening the material with hot water I smooth it over with a hot iron for the purpose of concentrating the gum.

The splint may be further modified in shape by the application of heat through the agency of steam, or a hot iron, or boiling water. The felt or other material may be saturated with the solution of shellac, and dried in a sheet, which may be subsequently cut and molded to the form desired by the application of the softening power of heat.

The shellac may be dissolved in an aqueous solution of the carbonate of ammonia or other preparation of ammonia or its equivalent, instead of alcohol or its equivalent, by which it will be concentrated in the felt by the evaporation of the solvent.

It is obvious that the shellac may be replaced by gum-copal, resin, or tragacanth, or any other similar matter which may be used to impregnate the cloth in the manner described, and that is ductile at about the temperature of boiling water, and is not affected by cold water or the moderate heat of the animal system, without departing from the character of my invention; but I prefer to use a solution of shellac in alcohol, which should be sufficiently concentrated to impart to the cloth a rigidity and elasticity similar to that of binders' board. The splints may be perforated to render them porous, and are as applicable to the limbs of the lower animals as to the human species.

Besides the advantages of cheapness, lightness, uniformity of support to the part under treatment, and readiness of preparation and adjustability to the varying configuration incident to inflammation and reduction, that are sufficiently indicated in the above description, splints of this character have points of value that render them equal, and, indeed, superior, to apparatus designed for special application and of the most expensive construction. The entire splint being molded to the limb, for instance, there is no necessity for interposed pads or bandages, and when it is desirable to relieve any particular point from pressure, or to apply lotions, or to provide for suppuration or emission of lymph, it is only necessary to cut away the corresponding part of the splint. It is therefore especially adapted to the treatment of compound comminuted fractures, as the splints may be perforated at the points of comminution.

One of the chief difficulties in the reduction of dislocations and fractures arises from the contraction of the muscles around the injured part, which causes the points of contact to slip beyond their proper continuous positions, and the violent and repeated attempts at extension that are usually made to counteract this tendency not only occasion a great deal of pain, but rouse the contractile power of the muscles to great resistance. With molded splints, however, fractures and dislocations are retained permanently in position by the unremitting resistance to contraction offered by the splint fitting the tuberosities or prominences of the joints and conforming to the variations of the muscles, and the perfect apposition of the injured parts averts the risk of disturbance.

It must be remembered that the object of my invention is to provide surgeons with a splint that is plastic and capable of being molded when hot to fit the form of the limb to which it is to be applied, to be unaffected by the application of cold water or by the natural warmth of the animal body, and at the same time be flexible when cold or dry. A splint made of cloth or felt prepared as I have described fills these conditions; but I do not mean to limit my claim to cloth or felt prepared in this way, nor to any particular material, for it matters not of what material the splint is made, if it possesses the peculiarities necessary to fill these conditions, it comes within the scope of my invention.

I claim therefore—

Making a surgical splint of a material which is plastic and flexible when hot and flexible when cold or dry, that its shape may be formed or modified at the will of the surgeon to fit the member or part to which it is to be applied, and which will be sufficiently firm without being rigid and painful to the wound or fracture.

DAVID AHL.

Witnesses:
A. C. KLINK,
WM. KEMBLE HALL.